United States Patent Office 2,988,490
Patented June 13, 1961

2,988,490
PRODUCTION OF RIFOMYCIN

Pinhas Margalith, Pardess-Chana, Israel, and Piero Sensi, Milan, Italy, assignors to Lepetit S.p.A., Milan, Italy
No Drawing. Filed Dec. 8, 1959, Ser. No. 858,078
Claims priority, application Great Britain July 20, 1959
5 Claims. (Cl. 195—80)

The invention relates to improvements in the production of rifomycin B by submerged fermentation and more particularly to the use of barbiturates as aids in such fermentation.

As disclosed in our copending application Serial No. 830,619, the production of a group of antibiotics is carried out by the submerged fermentation of *Streptomyces mediterranei* in a conventional nutrient medium containing corn steep liquor, ammonium sulfate, soy bean meal, peanut meal, etc., or combinations thereof, as nitrogen sources and glucose, sucrose, starch, dextrin, etc., or combinations thereof, as carbon sources as well as phosphates and other mineral elements. The simultaneous production of a family of antibiotics implies the separation of the desired fraction, by various procedures such as chromatography, countercurrent distribution, etc., which are both difficult to perform in large scale production and result in very low yields. In studying the use of various aids it has been found that barbiturates can be employed for the sole production of rifomycin B, permitting the recovery of crystalline rifomycin B in good yields.

Rifomycin B is prepared by the cultivation under particular conditions of many strains of *Str. mediterranei* as for example both the original strain ME/83 isolated from soil, as well as many variants or mutants obtained by conventional procedures well known to workers acquainted with the art.

The rifomycin producing Streptomyces has been deposited with the Culture Collection at the University of Pavia under the Collection Number P/3615, and with the American Type Culture Collection under the designation ATCC 13685. The description of *Str. mediterranei* was given in our above mentioned patent application.

The object of the present invention is to provide a nutrient, or as it may be called, an aid, which will stimulate the microorganism to generate increased yields of the desired substance, i.e. rifomycin B, without the concomitant production of the other fractions of rifomycin.

In a biological process, as in any chemical one, increased efficiency in the transformation of raw material into the desired end product is of primary importance. When the yield in such process is small and the cost of recovery of the desired product from a large volume of waste material is high, the yield becomes a controlling factor in the cost of production. Therefore any factor that promotes the production of the desired material is of great economical value.

The culturing of the microorganism for the production of rifomycin B may be carried out either by the surface growth or by submerged growth methods. In a commercial process the Streptomyces is usually grown in a submerged culture, the production of rifomycin B being promoted by an efficient aeration system.

The yield of rifomycin B is affected by many factors. Principally the concentration of nutrient ingredients; the balance between nitrogen and carbon sources and the mineral supplements. Further the physical conditions, such as agitation and aeration of the culture media, as well as the temperature are important variables.

In the process for producing rifomycin B, the suitable microorganism may be cultivated in an aqueous medium containing representative materials of the following class of ingredients:

(a) A source of organic nitrogen such as corn steep liquor, peptone, beef extract, yeast extract, vegetable protein material, casein, malt extract, distillers solubles etc., and/or inorganic nitrogen such as ammonium sulfate, ammonium nitrate, potassium nitrate etc.

(b) A carbon source such as starch, dextrin, glucose, sucrose, lactose etc.

(c) A mineral supplement such as calcium carbonate, potassium phosphate, magnesium sulfate, potassium chloride, zinc sulfate, ferrous sulfate, manganese sulfate, cobalt chloride, ammonium molybdate etc., or combinations of these.

(d) An aid of the class consisting of barbituric acids of the formula

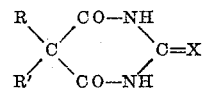

wherein R and R' are the same or different and represent hydrogen, lower alkyl, lower alkenyl and mononuclear carbocyclic aryl radicals and X represents sulfur or oxygen, and alkali metal salts thereof.

It is to be understood that these aids are effective in increasing the yield of rifomyclin B in fermentation processes employing any Streptomyces which produces the desired antibiotic and in the presence of any medium which supports antibiotic production by such species. These aids are effective when used in the medium in a concentration from 0.01% to 5.0%, preferably from 0.1% to 0.5%.

The aid being used may be added completely at the start of the fermentation or gradually during the fermentation.

The recovery of rifomycin B from fermentation broths is carried out by one of those methods which are conventional for recovering antibiotics. For example, the broth may be filtered at a pH between 5.0 to 8.0, although even at lower pH values most of the antibiotic passes into the filtrate. However, it is not advisable to filter at a pH lower than 5.0 owing to the slight solubility of the antibiotic in its acidic form. From the filtered broth the antibiotic is extracted by acidification and then extracted with a solvent which is capable of dissolving the antibiotic and in which the aid has a low order of solubility. For instance, the filtered broth may be extracted with an amount of chloroform ranging between from one-tenth of the volume to an equal volume of the broth or more, so as to bring into the solvent all of the rifomycin B and only a low percentage of the fermentation aid. From chloroform rifomycin B is extracted again into an aqueous solution at a pH between 5.0 and 9.0, preferably using phosphate buffers at a pH about 7.5. The volume of the aqueous phase may be about one-tenth of the volume of chloroform. All of the rifomycin B passes into the aqueous phase as the disodium salt and is again extracted after acidification, with an appropriate solvent such as chloroform or better still ethyl acetate. Butanol, benzene and various esters such as amyl and butyl acetate are also useful. On concentration in vacuo to a small volume rifomycin B crystallises in the form of beautiful orange yellow crystals. Rifomycin B is filtered, washed with ethyl acetate and ethyl ether and after drying shows the properties described in the above copending application. Rifomycin may be advantageously crystallised from ethyl acetate, benzene or methanol etc.

Alternatively, rifomycin may be extracted from the filtered broth, after acidification, with a solvent in which also the excess of aid is soluble. However, this procedure poses the problem of removing the aid, which may be resolved in several ways. For instance, the crude mixture may be treated with a solvent in which one of the two components is preferably soluble. The preferred process, however, is the one described above.

The following examples will serve only to illustrate the invention without excluding thereby other nutrient media or fermentation procedures employing the same or similar aids.

*Example 1*

A culture of *Str. mediterranei* was inoculated into 500 ml. shake flasks containing 100 ml. of seed medium; beef extract 5 g.; yeast autolysate 6 g.; peptone 5 g.; casein, hydrolysate 3 g.; glucose 20 g.; NaCl 1.5 g.; $H_2O$ dist. 1000 ml.; pH 7.3.

After growing for 24 hours on a reciprocating shaker (100 strokes per minute with 80 mm. amplitude) at 28° C. the flasks were inoculated into 10 lt. glass fermentors with 4 lt. of same seed medium. Vegetative growth took place under agitation (800 r.p.m.) and aeration (v./v./m.) at 28° C. After 24 hours 4–5% of volume of mycelial growth took place. The pH was 6.0–6.8. 10% inocula from the vegetative stage were introduced into another glass fermentor containing 4 lt. of fermentation media consisting of:

| | |
|---|---:|
| Glucose _____g__ | 50 |
| Soy bean meal _____g__ | 5 |
| $(NH_4)_2SO_4$ _____g__ | 7 |
| $MgSO_4 \cdot 7H_2O$ _____g__ | 1 |
| $KH_2PO_4$ _____g__ | 3 |
| Na barbiturate _____g__ | 4.0 |
| $CaCO_3$ _____g__ | 9 |
| $CuSO_4 \cdot 5H_2O$ _____mg__ | 3.3 |
| $ZnSO_4 \cdot 7H_2O$ _____mg__ | 50.0 |
| $FeSO_4 \cdot 7H_2O$ _____mg__ | 10.0 |
| $MnSO_4 \cdot 4H_2O$ _____mg__ | 4.0 |
| Distilled water _____ml__ | 1000 | pH corrected to 7.0 with concentrated NaOH. Sterilisation 30 minutes at 121° C.

Growth of the organism took place with agitation (800 r.p.m.) and aeration (1.5 v./v./m.) at 28° C. Maximum values for mycelial growth were about 25–35% of volume. Maximum antibiotic activity was obtained between 48 and 72 hours; yields were about 100–200 µg. rifomycin B per ml. mash.

*Example 2*

A shake flask culture of *Str. mediterranei* was prepared as in Example 1. Vegetative growth was conducted as before using the following seed medium:

| | |
|---|---:|
| Soy bean meal _____g__ | 5 |
| Ammonium sulfate _____g__ | 7 |
| Lactose _____g__ | 10 |
| Glucose _____g__ | 10 |
| $KH_2PO_4$ _____g__ | 1 |
| $MgSO_4 \cdot 7H_2O$ _____g__ | 1 |
| $ZnSO_4 \cdot 7H_2O$ sol. 0.2% _____ml__ | 1 |
| $CuSO_4 \cdot 5H_2O$ sol. 0.5% _____ml__ | 1 |
| $H_2O$ dist. _____ml__ | 1000 |

After 24 hours of vegetative growth a 4–5% of volume of mycelial growth was obtained. The pH was 4.0–4.5.

A 10% inoculum of the vegetative growth was used for the fermentation stage (fermentor as above).

The fermentation media consisted of:

| | |
|---|---:|
| Glucose _____g__ | 70 |
| Soy bean meal _____g__ | 5 |
| Peanut meal _____g__ | 20 |
| Ammonium sulfate _____g__ | 7 |
| $KH_2PO_4$ _____g__ | 2 |
| Na diethylbarbiturate _____g__ | 3 |
| $CaCO_3$ _____g__ | 6 |
| $MgSO_4 \cdot 7H_2O$ _____g__ | 1 |
| $CuSO_4 \cdot 5H_2O$ _____mg__ | 3.3 |
| $ZnSO_4 \cdot 7H_2O$ _____mg__ | 50 |
| $MnSO_4 \cdot 4H_2O$ _____mg__ | 4 |
| $FeSO_4 \cdot 7H_2O$ _____mg__ | 10 |
| $CoCl_2$ _____mg__ | 2 |
| Ammonium molybdate _____mg__ | 1 |
| $H_2O$ dist. _____ml__ | 1000 | pH corrected to 7.0.

The fermentation was conducted similarly to Example 1. Maximum titres of ca. 400–500 µg./ml. rifomycin B were obtained after 72–96 hours.

The fermentation broth (4 litres), which at the harvest has pH 6.0, is adjusted to pH 7.5 with dilute sodium hydroxide and filtered with the addition of a suitable filter aid. The mycelium is discarded after having been washed with water (1 litre) and the combined filtrates adjusted to pH 2.1 with 10 percent hydrochloric acid. The acidified broth is extracted twice with 1.5 litre portions of chloroform. The chloroform extract (2.95 litres) is again extracted twice with 750 ml. portions of phosphate buffer at pH 8.0. The buffer solution is acidified to pH 2.0 with 10 percent hydrochloric acid and extracted with ethyl acetate (500 ml.). The solvent is distilled off to a small volume (about 50 ml.). During the concentration rifomycin B precipitates and after cooling for several hours at 0° C. is collected and washed with a small amount of ethyl acetate and with ethyl ether. Rifomycin B, after drying, assays microbiologically 980 µg./mg. against a standard of rifomycin B. It decomposes at about 160° C. and does not melt below 300° C. $(a)_D^{20}$ −11° (c. 1, methanol).

*Example 3*

Fermentation procedures were similar to Example 1; the fermentation medium was fortified with 20 g./l. *phaseolus* bean meal. The aid was dimethylbarbituric acid at a concentration of 0.5%. Maximum titres of 50–700 µg./ml. of rifomycin were obtained after 48–72 hours of fermentation.

*Example 4*

Same fermentation procedures as in Example 2. The following fermentation medium was substituted in the final stage:

| | G. |
|---|---:|
| Corn steep liquor _____ | 10 |
| L-glutamic acid _____ | 20 |
| Ammonium sulfate _____ | 4 |
| Na phenylbarbiturate _____ | 0.5 |
| $CaCO_3$ _____ | 3 | as well as the supply of minerals as in Example 2. Maximum yields of 200–300 µg./ml. of rifomycin B were obtained after 72–96 hours.

*Example 5*

Fermentation procedure as in Example 4, with Na diethyl barbiturate as an aid. Maximum yields of 1500–2000 µg./ml. of rifomycin B were obtained after 96–120 hours of fermentation.

We claim:

1. A process for producing rifomycin B, which comprises fermenting a strain of *Streptomyces mediterranei* under submerged aerobic conditions in a nutrient medium containing a source of organic nitrogen, an assimilable carbon source, mineral salts and an aid of the class consisting of barbituric acids of the formula

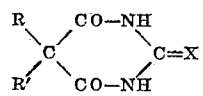

wherein R and R' are members of the class consisting of hydrogen, lower alkyl, lower alkenyl and mononuclear carbocyclic aryl radicals, X is a member of the class consisting of oxygen and sulfur, and the alkali metal salts thereof, whereby the formation of rifomycin B is enhanced and the formation of the other fractions of rifomycin is inhibited.

2. A process for producing rifomycin B, which comprises fermenting a strain of *Streptomyces mediterranei* under submerged aerobic conditions in a nutrient medium containing a source of organic nitrogen, an assimilable carbon source, mineral salts and from 0.01 to 5.0 percent of an aid of the class consisting of barbituric acids of the formula

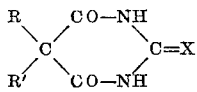

wherein R and R' are members of the class consisting of hydrogen, lower alkyl, lower alkenyl and mononuclear carbocyclic aryl radicals, X is a member of the class consisting of oxygen and sulfur, and the alkali metal salts thereof.

3. A process for producing rifomycin B, which comprises fermenting a strain of *Streptomyces mediterranei* under submerged aerobic conditions in a nutrient medium salts and 0.01 to 5.0 percent of 5,5-diethylbarbituric acid.

4. A process for producing rifomycin B, which comprises fermenting a strain of *Streptomyces mediterranei* under submerged aerobic conditions in a nutrient medium containing a source of organic nitrogen, an assimilable carbon source, mineral salts and 0.01 to 5.0 percent of 5-phenyl-5-ethylbarbituric acid.

5. A process for producing rifomycin B, which comprises fermenting a strain of *Streptomyces mediterranei* under submerged aerobic conditions in a nutrient medium containing a source of organic nitrogen, an assimilable carbon source, mineral salts and 0.01 to 5.0 percent of 5-ethyl-5-methylbarbituric acid.

References Cited in the file of this patent

Pridham: Antibiotics Annual, 1956–57, pages 947–953.

Pridham et al.: Applied Microbiology, January 1958, pages 55, 60, 61, 64, 65, 67, and 68.